US007404245B2

(12) United States Patent
Whitehead et al.

(10) Patent No.: US 7,404,245 B2
(45) Date of Patent: Jul. 29, 2008

(54) FUEL LINE DISCONNECT TOOL

(75) Inventors: Michael L. Whitehead, Clarinda, IA (US); James H. Strickland, Minter, AL (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 11/407,260

(22) Filed: Apr. 19, 2006

(65) Prior Publication Data

US 2006/0277735 A1 Dec. 14, 2006

Related U.S. Application Data

(60) Provisional application No. 60/684,113, filed on May 24, 2005.

(51) Int. Cl.
*B23P 19/04* (2006.01)

(52) U.S. Cl. .............................. 29/237; 29/270; 269/3; 269/6; 81/63.1; 81/58.2

(58) Field of Classification Search .................. 29/237, 29/270, 278; 269/3, 6; 81/63.1, 420, 58.2, 81/118–119
See application file for complete search history.

(56) References Cited

U.S. PATENT DOCUMENTS

| | | | | |
|---|---|---|---|---|
| 539,441 | A * | 5/1895 | Pedersen | 81/177.8 |
| 922,258 | A * | 5/1909 | Caven | 81/176.2 |
| 960,193 | A * | 5/1910 | Peterson | 7/165 |
| 2,533,112 | A * | 12/1950 | Hayden | 227/63 |
| 4,055,359 | A | 10/1977 | McWethy | |
| 5,455,995 | A | 10/1995 | Pool | |
| 5,802,692 | A * | 9/1998 | Philippe | 29/263 |
| 6,195,862 | B1 | 3/2001 | Chang | |
| 6,447,757 | B1 * | 9/2002 | Orlowski et al. | 424/53 |
| 2006/0277735 | A1 * | 12/2006 | Whitehead et al. | 29/237 |

* cited by examiner

*Primary Examiner*—Lee D Wilson
(74) *Attorney, Agent, or Firm*—Banner & Witcoff, Ltd.

(57) ABSTRACT

A fuel line disconnection tool includes a handle member with a hand grip end and a slotted opposite head end adapted to receive generally mirror image flanged adapters having semi-cylindrical tubular projections which enable placement of the adapters in the slot at the head end of the handle. The adapters may then be fitted about a fuel line and the handle attached thereto and manipulated to disengage the connection mechanism between the fuel line and fuel filter.

3 Claims, 3 Drawing Sheets

FUEL LINE DISCONNECT TOOL

CROSS REFERENCE TO RELATED APPLICATION

This is a utility application derived from incorporating by reference, claiming priority to and based upon previously filed provisional application Ser. No. 60/684,113 filed May 24, 2005 entitled "Fuel Line Disconnect Tool".

BACKGROUND OF THE INVENTION

In a principal aspect the present invention relates to a tool useful for the purpose of, for example, disconnecting a flexible fuel line from a fuel filter such as used in many General Motors products. The tool is also useful for disconnecting lines other than fuel lines.

During automotive repair operations, it is often necessary to remove and replace the fuel filter from a fuel line. The mechanism for connecting a fuel line to a fuel filter is often a type wherein the connection mechanism is accessible through an annular space about the fuel line connected to the fuel filter. That is, retention elements are incorporated in the fuel line capable of fitting over and gripping a nozzle protruding from the fuel filter. Mechanisms of this type are disclosed, for example, in U.S. Pat. No. 4,055,359.

Various devices have been proposed for disconnecting such a fuel line from such a fuel filter. For example, a tool identified as a GM Fuel Line Tool manufactured by OTC as their product No. OTC6603 discloses the use of a tool which includes bifurcated arms with a disconnection element positioned at the ends of the bifurcated arms to effect fuel line disconnection. Tools of this general nature are depicted in U.S. Pat. Nos. 5,455,995 and 6,195,862 B1.

While such tools have been found to be useful, they often pose especially difficult problems when used in restricted spaces where placing such a tool in contact with a fuel line connection mechanism is difficult. Thus, there has developed a need to provide an improved mechanism or means for disconnecting a fuel filter from a fuel line as well as a tool that is useful for disconnection of other types of lines in accessible as well as inaccessible locations.

SUMMARY OF THE INVENTION

Briefly, the present invention relates to a fuel line or line disconnection tool which is comprised of a handle member having a hand grip end and an opposite, slotted head end. The slotted head end is made to receive separate first and second adapters each adapter including a generally semicircular flange with an axially projecting, semi-cylindrical release elements designed to engage the fuel line connection mechanism and effect release of the mechanism. Thus, the release elements may be placed on opposite sides of the fuel line (or other type of line) and then the projecting flanges of the adapters positioned the slot at the slotted end of the handle member, or handle. The handle may subsequently be manipulated to move the adapters in a manner which effects release of a fuel line from a fuel filter or other lines attached to some type of element.

Thus, it is an object of the invention to provide an improved line disconnection tool, especially useful as a fuel line disconnection tool.

It is a further object of the invention to provide a multipart line disconnection tool which includes adapters to fit about the line and cooperate with a manipulating handle mechanism.

It is a further object of the invention to provide a fuel line disconnection tool which is easy to manipulate, which may be used in extremely restricted spaces and which is rugged and economical.

These and other objects, advantages and features of the invention will be set forth in the detailed description which follows.

BRIEF DESCRIPTION OF THE DRAWINGS

In the detailed description which follows, reference will be made to the drawing comprised of the following figures.

DESCRIPTION OF THE PREFERRED EMBODIMENT

Figure 7:
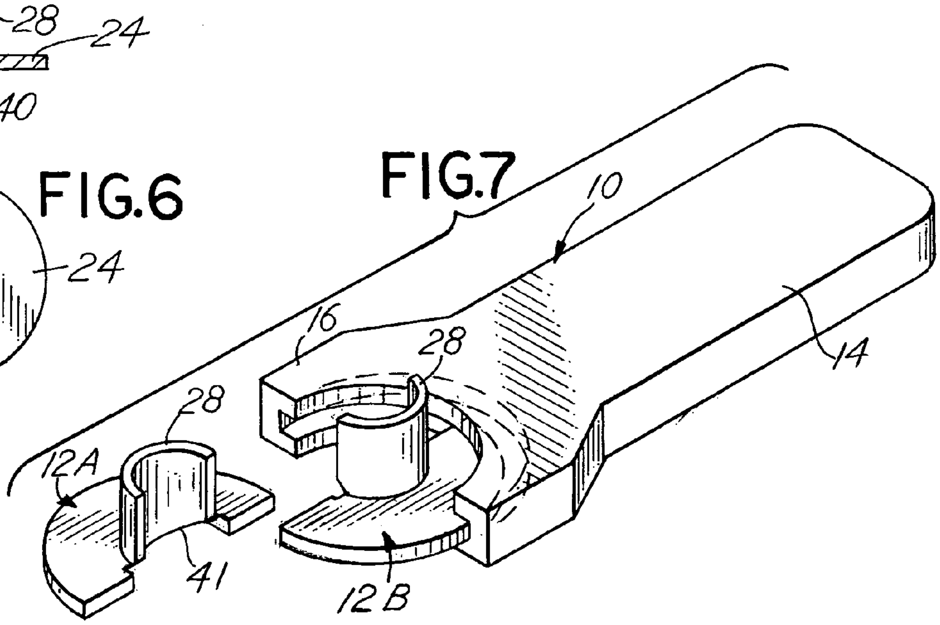
FIG. 7 is an isometric view of an embodiment of the tool incorporating the elements of FIGS. 1 and 2.

Referring to the figures, an embodiment of the tool of the invention is comprised of three separate components. The first component is a handle 10. Second and third components comprise fuel line connection mechanism adapters, such as the adapter 12 shown in FIG. 2. Thus, two adapters 12 (12A and 12B in FIG. 7) are used in combination with a single handle 10 in order to complete the embodiment of the tool of the invention and in order to effect the manner of operation or method of the claimed invention. More specifically, the adapters 12A and 12B may be fitted about a line, such as a fuel line, and inserted into the annular space about the line to manipulate and disconnect or disengage the connection mechanism which holds the line connected to a fuel filler, for example, and more particularly to a connection nipple or nozzle projecting from the filter.

The handle 10 includes a hand grip end 14 and an adapter engagement or slotted head end 16. The adapter engagement end 16 includes a generally semicircular recess or slot 18 which is symmetrical about a longitudinal axis 20. The slot 18 is thus defined by spaced ribs 22 and 24.

The two adapters 12A and 12B each include a generally semicircular flange 24 with a throughpassage section 26 and an upstanding generally semi-cylindrical section, element or portion 28 extending axially from the inner edge of the flange 24. Cylindrical section or portion 28 extends axially outward from the plane of the flange 24 and defines the passage or passage section 26. Semi-cylindrical section or portion 28 includes a first axially parallel side edge 30 and a second axially parallel side edge 32. The side edges 30 and 32 are aligned with the outer radial edges 34 and 36, respectively of flange 24. Axis 40 of the adapters 12A, 12B is perpendicular relative to the plane of each flange 24 and serves as the axis of revolution of the cylindrical section 28. The adapters 12A, 12B include a cutaway portion defining an incline portion or surface 41 which facilitates manipulation and enables some movement of the adapters 12A, 12B when they are inserted in pairs in the slot 18 of the handle 10.

The adaptors 12A and 12B are positioned so that the flange 24 associated with each of the adaptors 12A and 12B will each slide into the slot 18 of the head end 14 of the handle 10. That is, it is appropriate and that at least a portion of the flange 24 of each of the adapters 12A and 12B be fitted into the slot 18. Utilizing semi-cylindrical or generally semi-cylindrical flange 24 facilitates maintaining the adapters 12A, 12B with a portion of the flange 24 within the slot 18. Further, since each flange 24 is generally semi-cylindrical, the adapters 12A and 12B cannot easily rotate or slide out of the slot 18 when they are being manipulated. Thus, the utilization of semi-cylindrical flanges 24, which align generally in the same plane within the slot 18, facilitates the utility of the invention.

The incline cut away portions 41 of the adapters 12A and 12B form a generally 45° angle with a plane of the flanges 24. These cut out portions 41 further facilitate placement of each adapter 12A and 12B over expanded diameter portions of a fuel line 59 that connects to a fuel filter 51 at the juncture defined by the connector of the fuel line 59 and fuel filter 61.

Small or restricted size axial slots 33 and 35 are positioned on the outside surface of the cylindrical section 28 of the adapters 12A and 12B and define a cut section through each flange 24.

Figure 8:
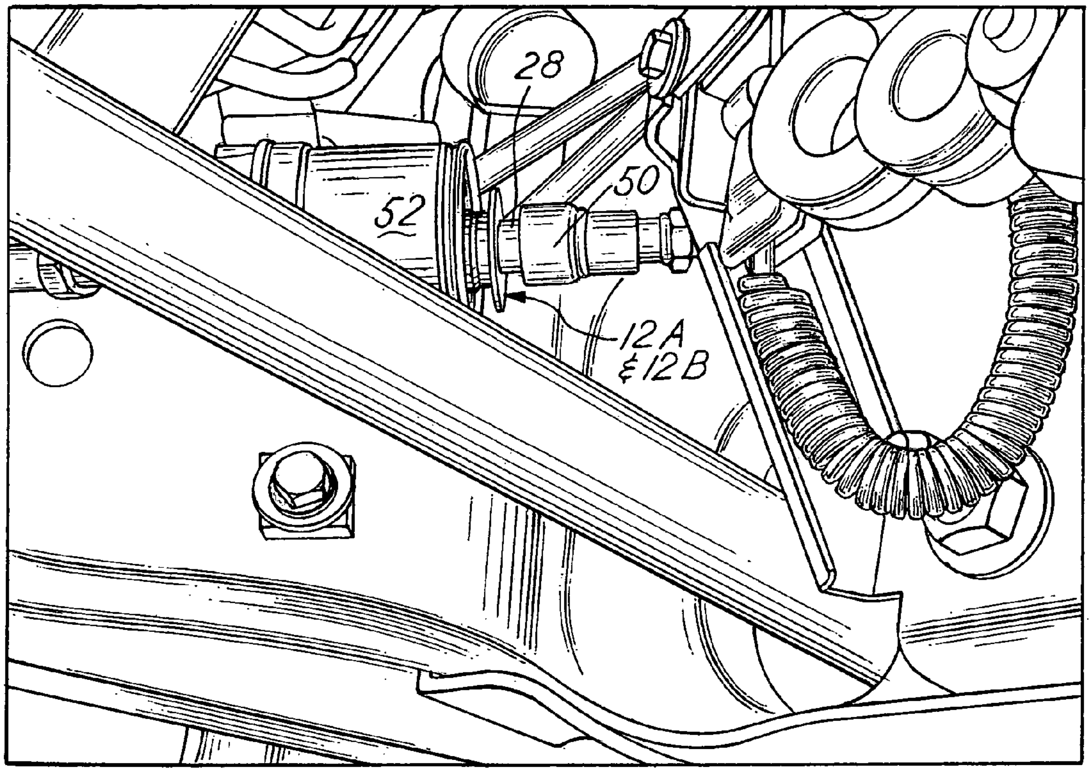
FIG. 8 is an isometric view that illustrates the step of placing flange adapters about the fuel line prior to engagement of the handle with the adapters.
Figure 9:
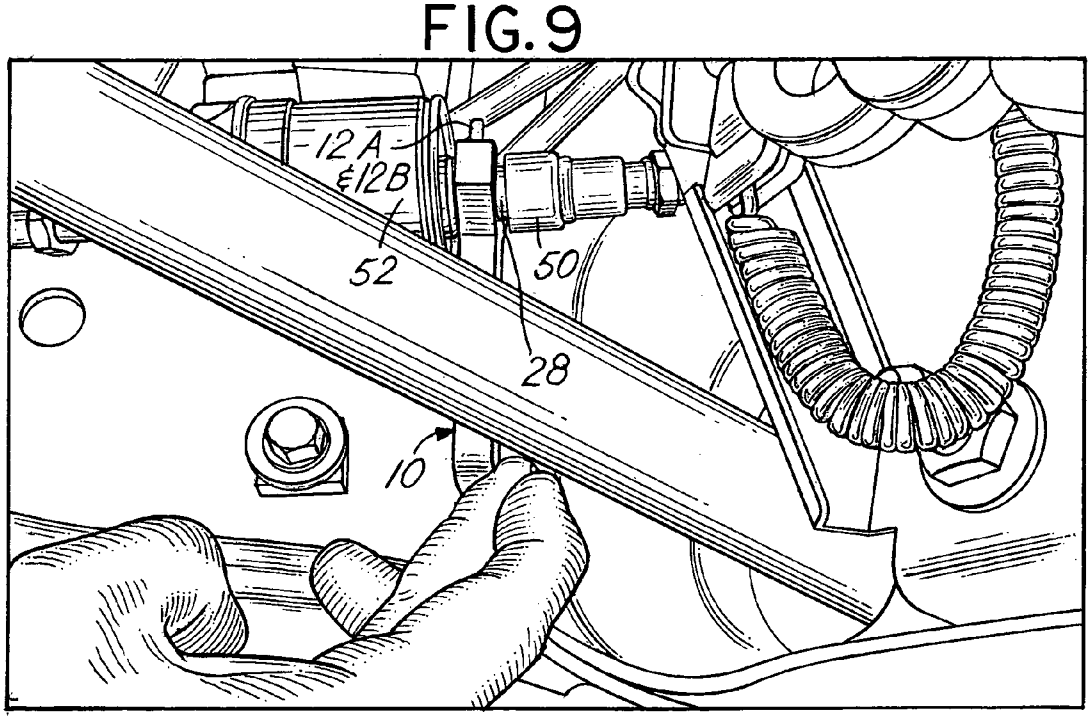
FIG. 9 is an isometric view illustrating positioning of the handle in combination with the fuel line adapters.
Figure 10:
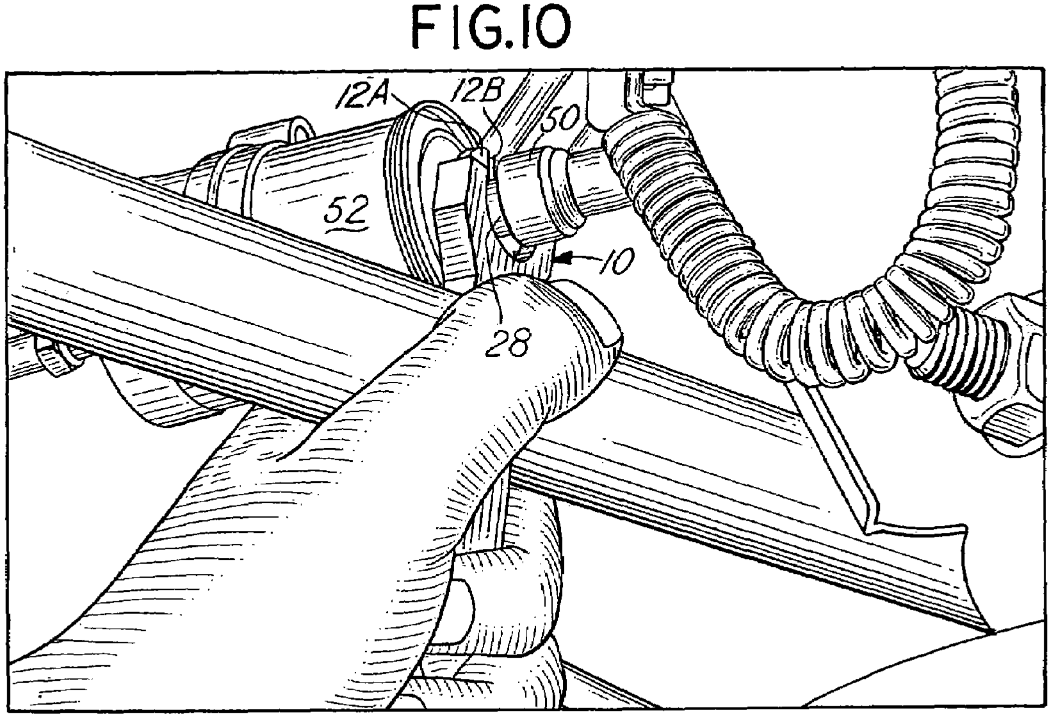
FIG. 10 is an isometric view illustrating the manner of manipulation of the tool in order to effect disconnection of the fuel line from the fuel filter.
Figure 11:
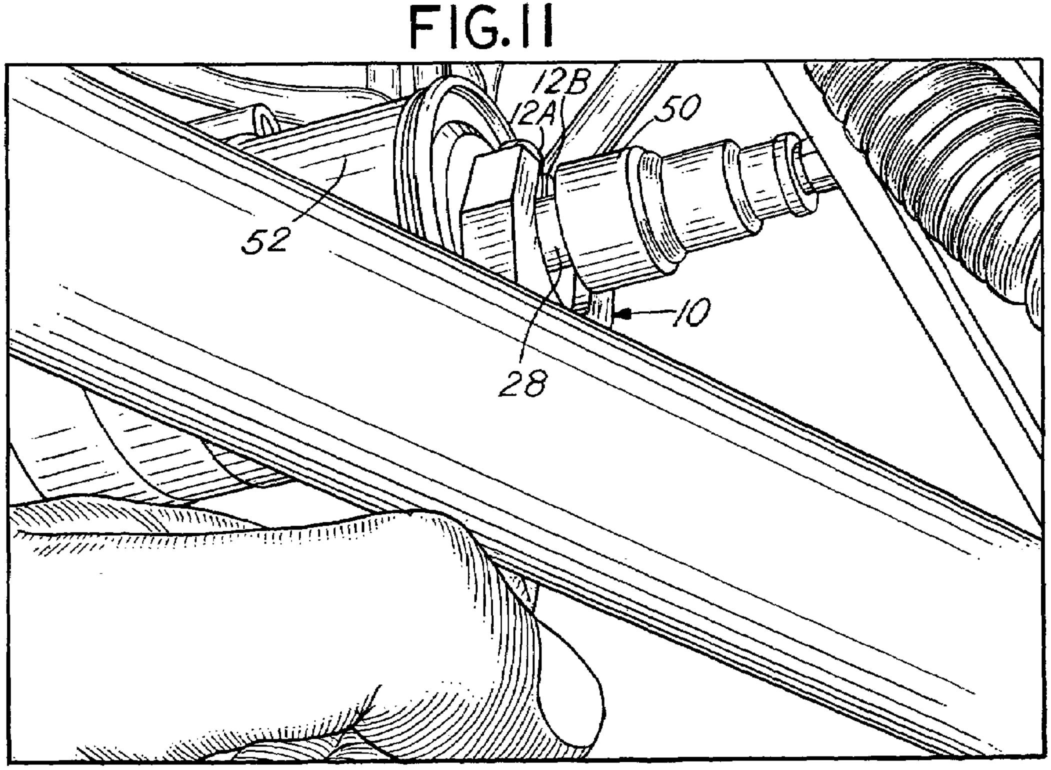
FIG. 11 is an isometric view illustrating the manner of manipulation of the tool to effect fuel line disconnection.

The remaining FIGS. 7-11 illustrate the methodology in the operation of the tool of the invention. More specifically, the handle 10 is designed to cooperate with and retain first and second adapters 12A and 12B in slot 18. The flanges 24 of the adapters 12A and 12B are thus designed to generally snuggly fit within the slot 18 defined in the head end 16 of handle 10. In practice, as shown in FIG. 8, the adapters 12A, 12B are fitted in opposed relationship about the fuel line 5A and the connection between a fuel filter 61 and a flexible fuel line 59. Subsequently, as depicted in FIG. 9, the handle 10 is engaged with the semicircular flanges 24 of the two opposed adapters 12A, 12B. As shown in FIGS. 10 and 11, the handle 10 is then manipulated to engage the adapters 12A, 12B and, more particularly, the cylindrical portion 28 of the adapters 12A, 12B with the disconnection mechanism in the annular space 65 defined between the fuel line 59 and the fuel filter device 61. Manipulation may be effected by rocking, pushing and the like on the handle 10.

It is possible to vary the construction of the invention without departing from the spirit and scope thereof. Thus, the configuration of the handle 10, the size of the slot 18, the size and the angular relationship of the flanges 24 to the cylindrical sections 28 of the adapters 12A and 12B may all be varied to facilitate placement of the tool in a restricted space within an engine compartment, for example. Other changes may be made without departing from the spirit and scope of the invention. That is, for example, the radial extent of the flanges 24 may be varied; the flanges 24 need not be mirror images, but may together comprise a generally encircling combination when used in combination with the slot 18 of the handle 10. The invention is therefore to be limited only by the following claims and equivalents thereof.

What is claimed is:

1. A fuel line disconnection tool system comprising, in combination:

a handle member, a first separate fuel line engaging adaptor, and a second separate fuel line engaging adaptor, said handle member including a longitudinal axis with a hand grip end and an opposite fuel line adapter retaining end, said adapter retaining end comprising a generally semicircular slot opening symmetrically about the axis for receipt and retention of said first and second fuel line engaging adapters simultaneously;

adapter, said first adapter including a generally semicircular flange with a semicircular center line passage and radial edges extending outwardly from the passage, said flange sized to slidably fit into a portion of the handle slot, said first adapter further including a generally semi-cylindrical tubular section extending coaxially from a side face of the semi-circular flange, concentric with the flange passage and having a radius generally equal to the radius of the passage in the flange, the semi-cylindrical tubular section including edges extending upwardly from the flange and aligned with the radial edges of the flange; and said second fuel line engaging adapter substantially the mirror image of the first adapter, said separate first and second adapters slidably positionable simultaneously in opposition in the handle slot with the generally semi-cylindrical tubular sections aligned and extending axially from one side face of the flange to define a tube section passage for a fuel line connection.

2. A method for removal of a fuel line connection with the tool of claim 1 comprising the steps of (a) positioning said first and second fuel line adapters about a fuel line in opposition to connection mechanism;

(b) positioning the handle slot over flanges of adapters; and (c) manipulating the fuel handle and adapters to disengage connection mechanism.

3. The tool system of claim 1 wherein each adapter further includes a cut away portion (41) of the semi-cylindrical flange at the semi-circular center line passage.

* * * * *

UNITED STATES PATENT AND TRADEMARK OFFICE

CERTIFICATE OF CORRECTION

Figure 2:
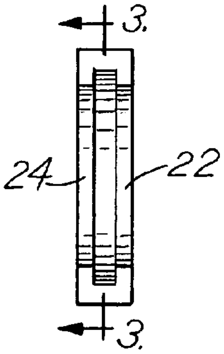
FIG. 2 is an end view from the head or slotted end of the tool of FIG. 1.
Figure 1:
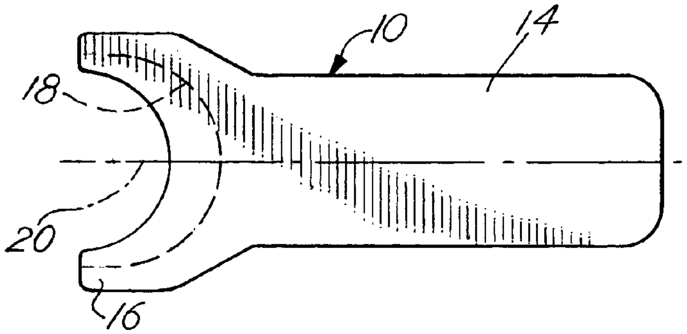
FIG. 1 is a side elevation of an embodiment of the handle construction of the fuel line or line disconnection tool.

PATENT NO. : 7,404,245 B2
APPLICATION NO. : 11/407260
DATED : July 29, 2008
INVENTOR(S) : Michael L. Whitehead and James H. Strickland It is certified that error appears in the above-identified patent and that said Letters Patent is hereby corrected as shown below:

IN THE DRAWINGS:

Figure 2 – delete “24” and add --23--

Figure 6:
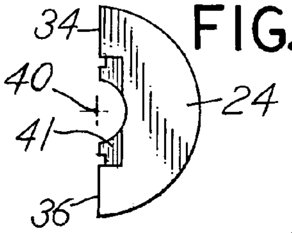
FIG. 6 is a back side election view of the adapter of FIG. 4.

Figure 6, insert --12--

Figure 9 insert --65-- and --59--

Please replace Figures 2 and 6 with the following Figures 2 and 6

Figure 2 – delete “24” and add --23--

Figure 6, insert --12--

FIG.2

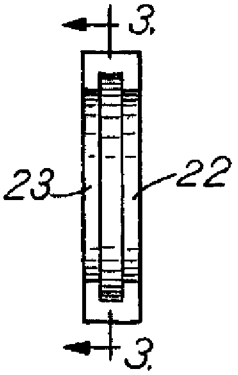

FIG.6

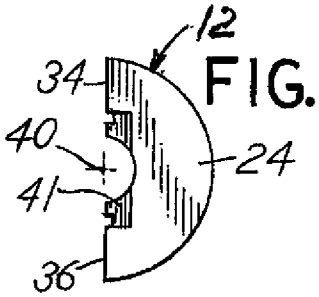

UNITED STATES PATENT AND TRADEMARK OFFICE
CERTIFICATE OF CORRECTION

PATENT NO. : 7,404,245 B2
APPLICATION NO. : 11/407260
DATED : July 29, 2008
INVENTOR(S) : Michael L. Whitehead and James H. Strickland It is certified that error appears in the above-identified patent and that said Letters Patent is hereby corrected as shown below:

Please replace Figure 9 with the following Figure 9
Figure 9 – insert --65-- and --59--

FIG.9

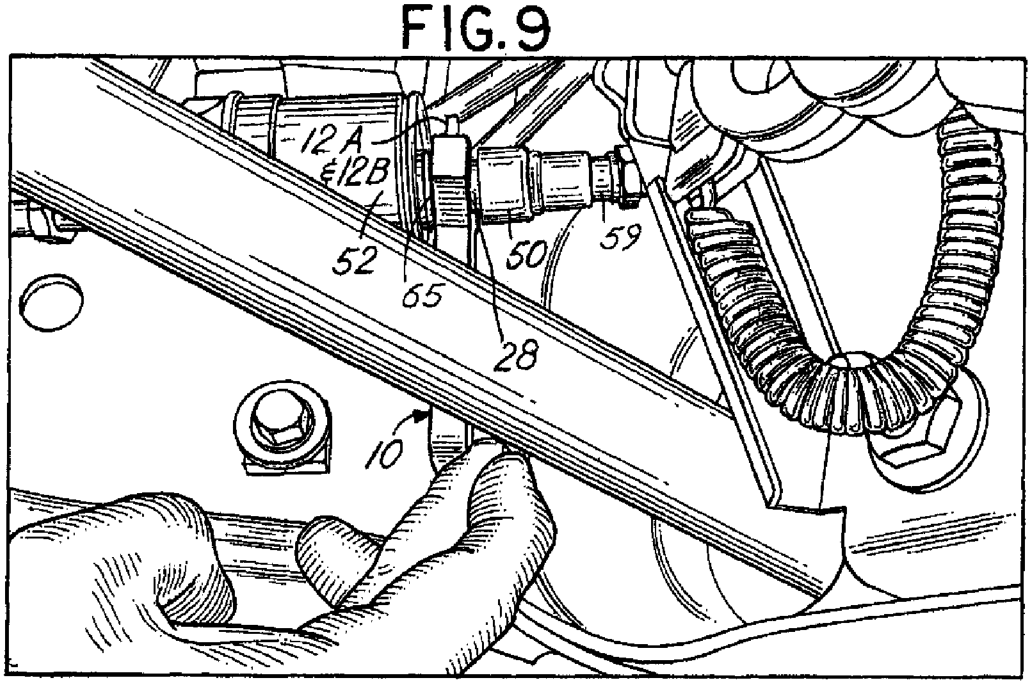

Column 1, line 56, after “positioned” insert --in--

Column 2, line 25, delete “election” and insert --elevation--

Figure 4:
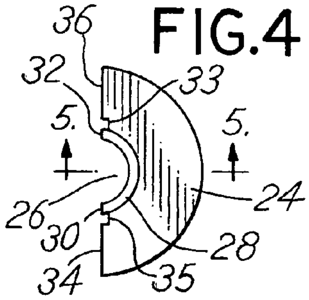
FIG. 4 is a front view depicting the flanged adapter used in combination with the handle of FIG. 1. A pair of such adapters is used in face-to-face relationship during utilization of the tool.
Figure 3:
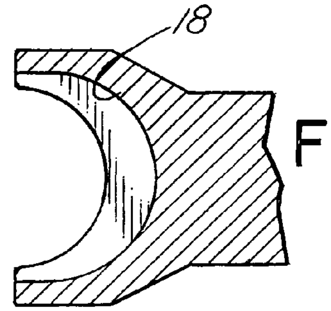
FIG. 3 is a side cross sectional view of the slotted head end of the tool taken substantially along the line 3-3 in FIG. 2.
Figure 5:
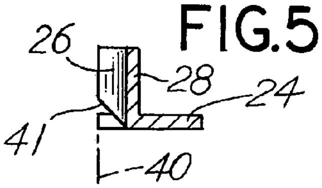
FIG. 5 is a cross sectional view of the generally semi-cylindrical flanged adapter of FIG. 4 taken along the line 5-5.

Column 2, line 46, delete “FIG. 2” and insert --FIGS. 4-6--

Column 2, line 61, delete “24” and insert --23--

Column 3, line 29, delete “51” and insert --52--

Column 3, line 30, after “connector” insert --50--

Column 3, line 30, delete “61” and insert --52--

UNITED STATES PATENT AND TRADEMARK OFFICE

CERTIFICATE OF CORRECTION

PATENT NO. : 7,404,245 B2 Page 3 of 3
APPLICATION NO. : 11/407260
DATED : July 29, 2008
INVENTOR(S) : Michael L. Whitehead and James H. Strickland It is certified that error appears in the above-identified patent and that said Letters Patent is hereby corrected as shown below:

Column 3, line 42, delete “5A” and insert --59--

Column 3, line 43, delete “61” and insert --52--

Column 3, line 51, delete “61” and insert --52--

Signed and Sealed this

Nineteenth Day of May, 2009

JOHN DOLL
*Acting Director of the United States Patent and Trademark Office*